(12) United States Patent
Takikawa et al.

(10) Patent No.: US 8,964,334 B2
(45) Date of Patent: Feb. 24, 2015

(54) DISK DRIVE SUSPENSION

(71) Applicant: NHK Spring Co., Ltd., Yokohama-shi, Kanagawa (JP)

(72) Inventors: Kenichi Takikawa, Aiko-gun (JP); Masao Hanya, Aiko-gun (JP); Toshiki Ando, Aiko-gun (JP)

(73) Assignee: NHK Spring Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 13/929,619

(22) Filed: Jun. 27, 2013

(65) Prior Publication Data

US 2014/0022670 A1 Jan. 23, 2014

(30) Foreign Application Priority Data

Jul. 19, 2012 (JP) .................................. 2012-160864

(51) Int. Cl.
*G11B 5/596* (2006.01)
*G11B 21/16* (2006.01)
*G11B 5/48* (2006.01)

(52) U.S. Cl.
CPC ................ *G11B 5/486* (2013.01); *G11B 5/482* (2013.01); *G11B 5/4826* (2013.01); *G11B 5/4853* (2013.01); *G11B 5/4873* (2013.01)
USPC ..................................... 360/294.4; 360/245.9

(58) Field of Classification Search
USPC ............. 360/244.5, 245, 245.3, 294.3, 294.4, 360/245.9
See application file for complete search history.

(56) References Cited

U.S. PATENT DOCUMENTS

| 8,446,694 | B1 * | 5/2013 | Tian et al. ..................... 360/245 |
| 8,675,314 | B1 * | 3/2014 | Bjorstrom et al. ......... 360/294.3 |
| 2007/0002500 | A1 * | 1/2007 | Yao et al. ................... 360/294.4 |
| 2011/0096438 | A1 * | 4/2011 | Takada et al. .............. 360/244.2 |
| 2011/0149440 | A1 * | 6/2011 | Uematsu et al. ........... 360/245.3 |
| 2014/0022671 | A1 * | 1/2014 | Takikawa et al. .......... 360/234.6 |
| 2014/0022674 | A1 * | 1/2014 | Takikawa et al. .......... 360/244.5 |
| 2014/0022675 | A1 * | 1/2014 | Hanya et al. ............... 360/244.5 |
| 2014/0085755 | A1 * | 3/2014 | Hanya et al. ............... 360/244.5 |

FOREIGN PATENT DOCUMENTS

| EP | 2105918 A1 * | 9/2009 |
| JP | 2003-059219 A | 2/2003 |
| JP | 2010-146631 A | 7/2010 |

* cited by examiner

*Primary Examiner* — Will J Klimowicz
(74) *Attorney, Agent, or Firm* — Holtz, Holtz, Goodman & Chick PC

(57) ABSTRACT

A slider and a pair of microactuator elements are disposed on a gimbal portion of a flexure. The gimbal portion comprises a first tongue portion, a second tongue portion, and a hinge portion. A trailing-side portion of the slider is secured to the second tongue portion. A leading-side portion of the slider is movable relative to the first tongue portion. A conductive circuit portion comprises a conductor connected to an element of the slider and a conductor connected to electrodes of microactuator elements. The conductive circuit portion comprises a first wiring pattern portion disposed inside microactuator elements and a second wiring pattern portion extending rearwardly relative to the gimbal portion.

8 Claims, 12 Drawing Sheets

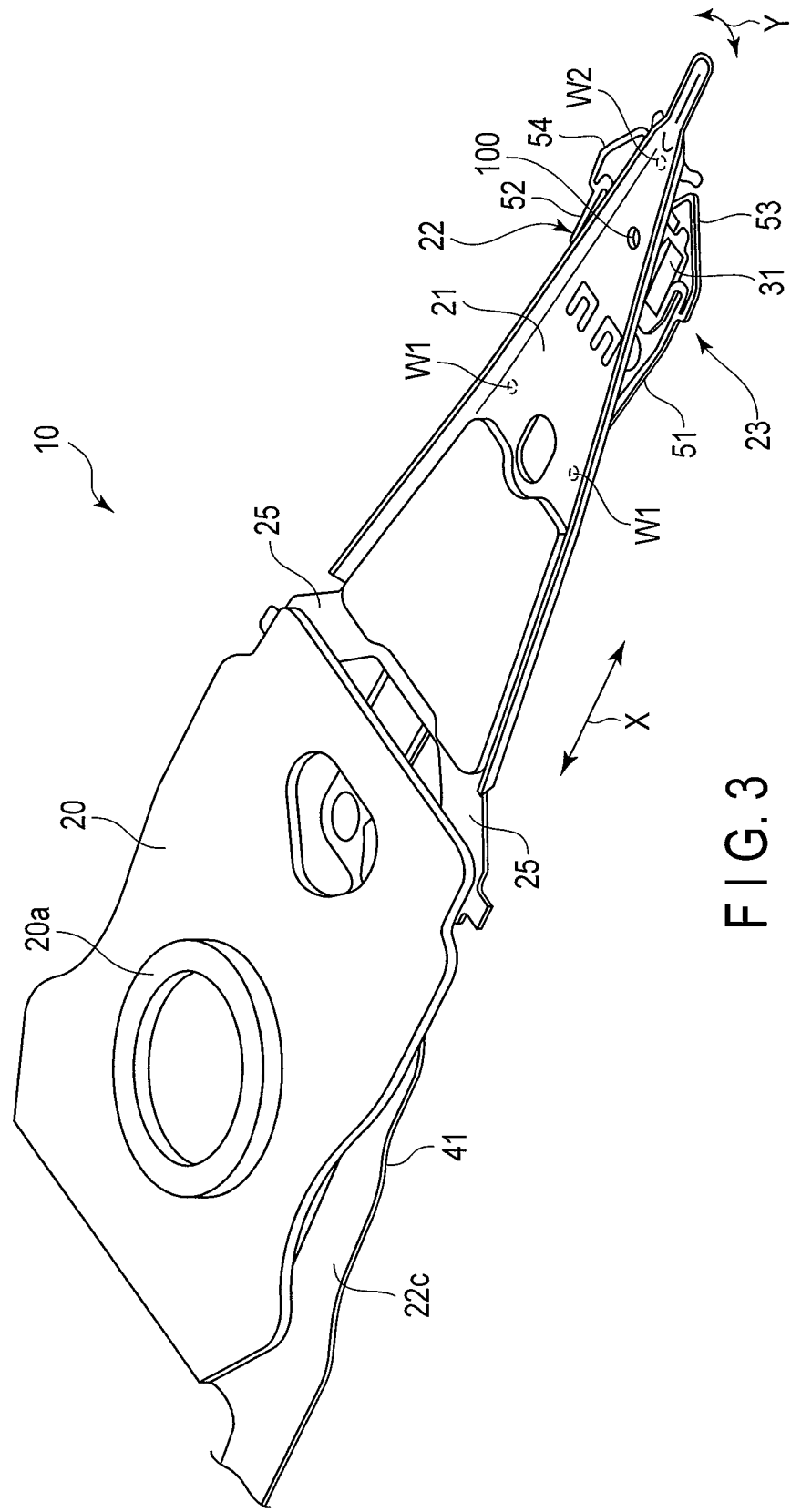
F I G. 3

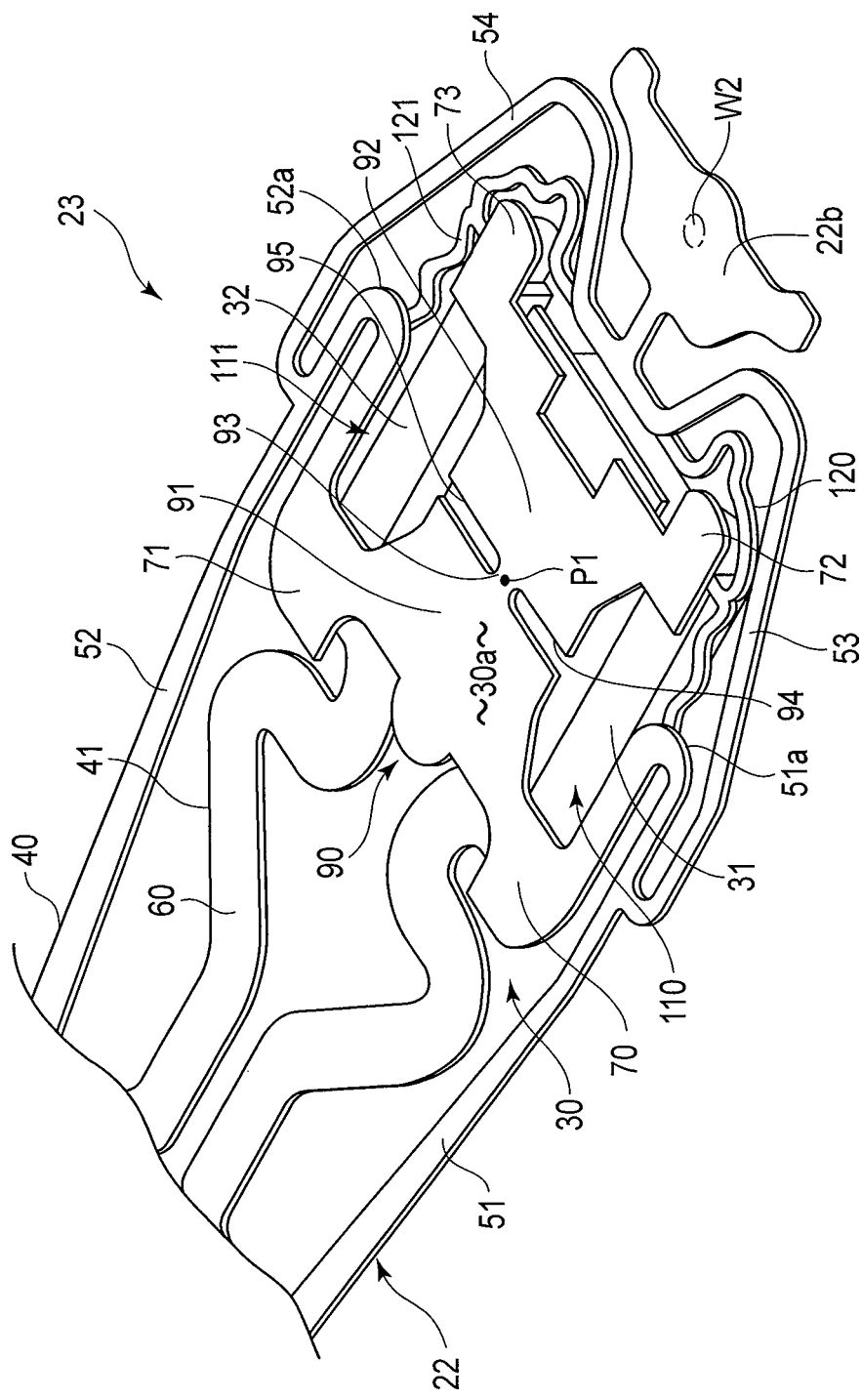
F I G. 5

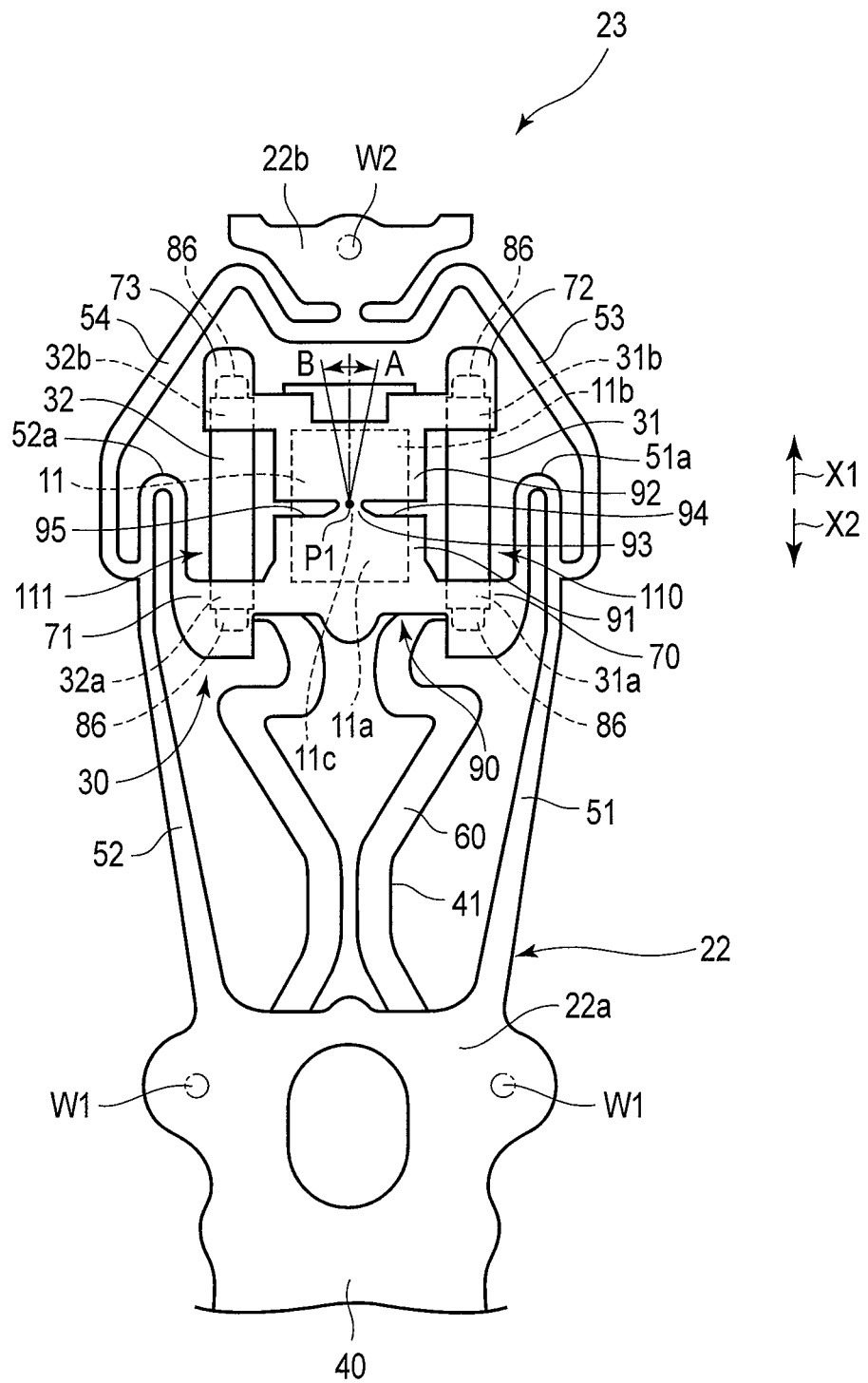
F I G. 6

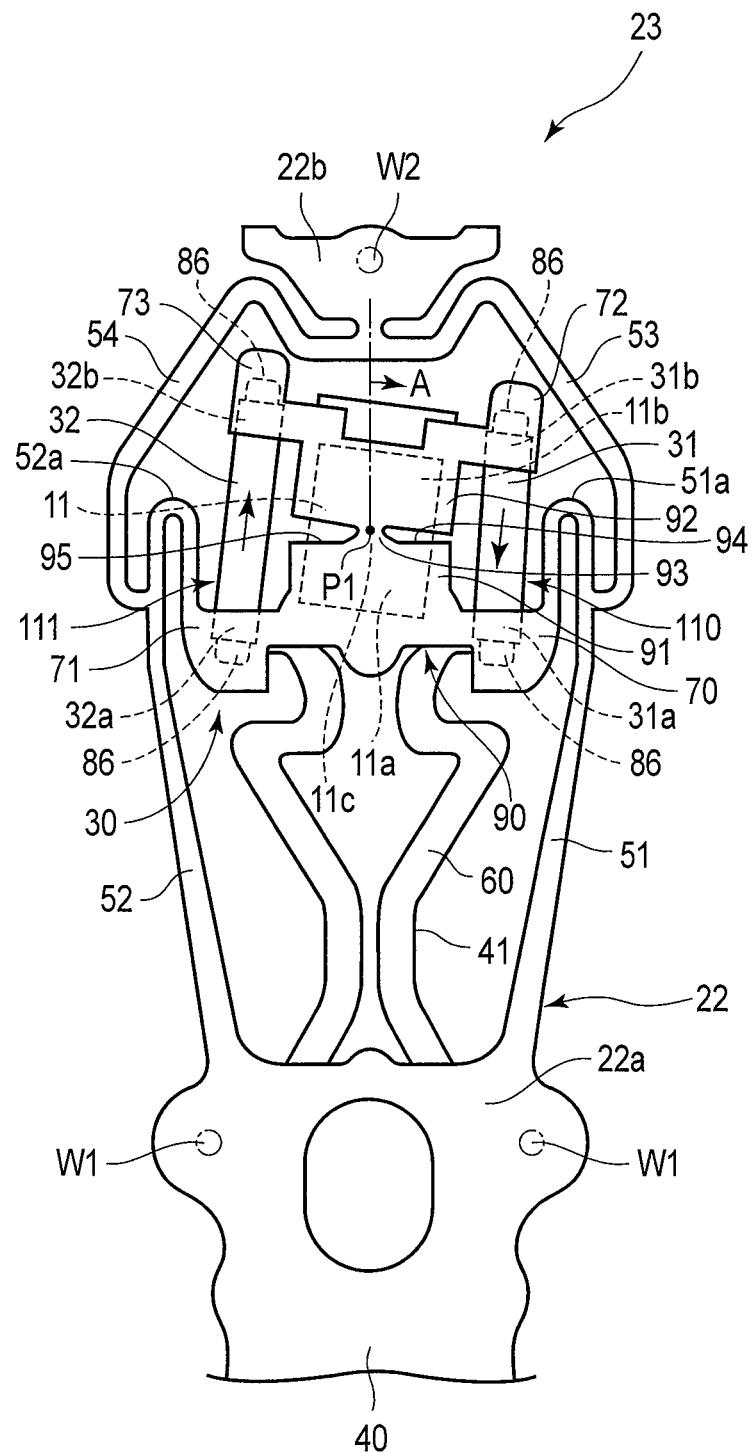
F I G. 12

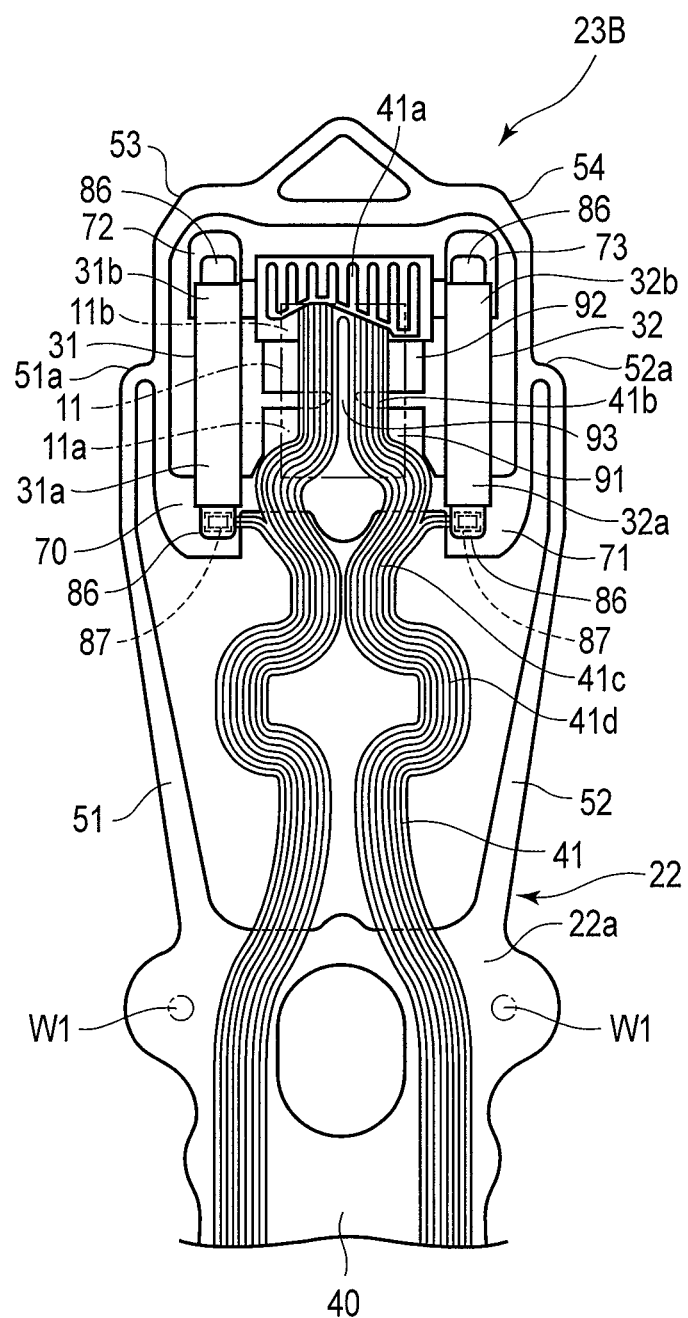
F I G. 14

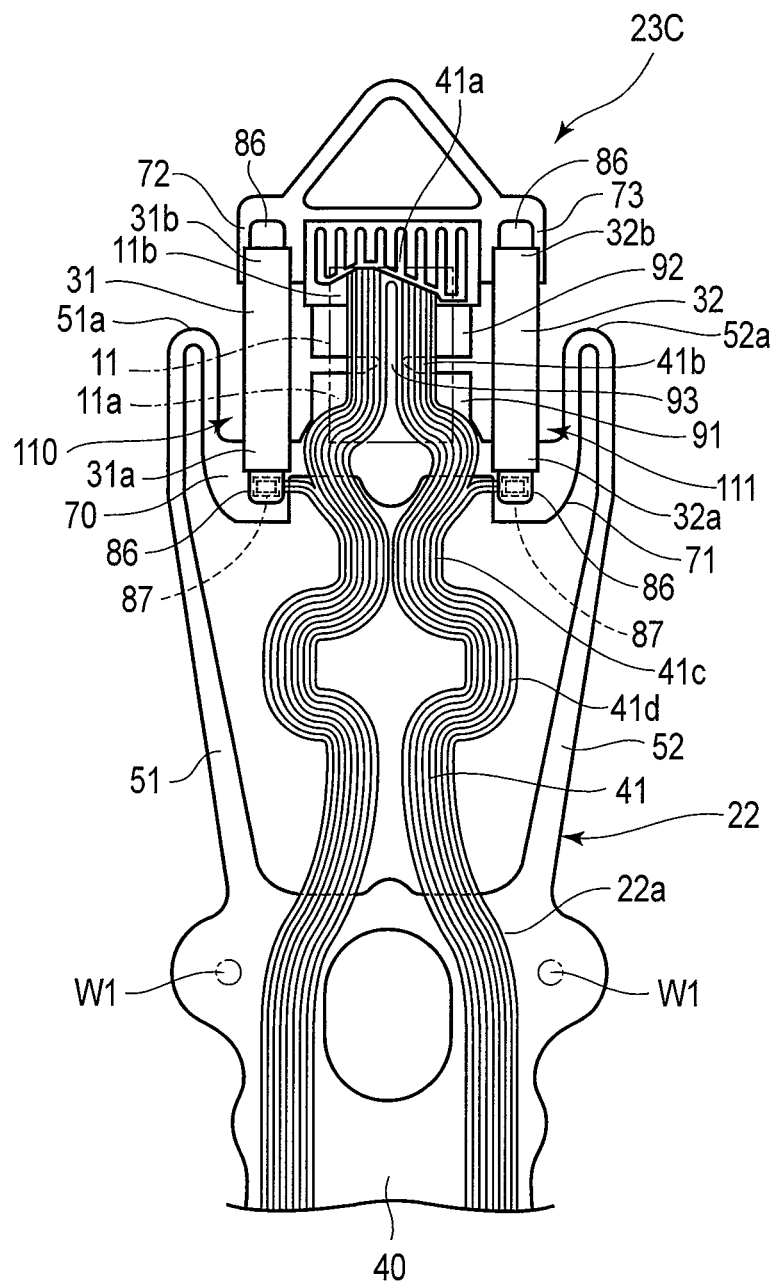
F I G. 15

DISK DRIVE SUSPENSION

CROSS-REFERENCE TO RELATED APPLICATIONS

This application is based upon and claims the benefit of priority from prior Japanese Patent Application No. 2012-160864, filed Jul. 19, 2012, the entire contents of which are incorporated herein by reference.

BACKGROUND OF THE INVENTION

1. Field of the Invention

This invention relates to a disk drive suspension comprising a microactuator element of, for example, lead zirconate titanate (PZT).

2. Description of the Related Art

A hard disk drive (HDD) is used in an information processing apparatus, such as a personal computer. The HDD comprises a magnetic disk rotatable about a spindle, a carriage turnable about a pivot, etc. The carriage, which comprises an actuator arm, is configured to be turned transversely relative to tracks of the disk about the pivot by a positioning motor, such as a voice coil motor.

A suspension is mounted on the actuator arm. The suspension comprises a load beam and flexure superposed thereon. A slider, which constitutes a magnetic head, is mounted on a gimbal portion formed near the distal end of the flexure. The slider is provided with elements (transducers) for accessing data, that is, for reading or writing data. The load beam, flexure, slider, etc., constitute a head gimbal assembly.

In order to overcome the increase in the recording density of disks, the magnetic head should be more precisely positioned relative to the recording surface of each disk. To attain this, dual-stage-actuator (DSA) suspensions have been developed that combine a positioning motor (voice coil motor) and microactuator element made of a piezoelectric material, such as lead zirconate titanate (PZT).

The distal end of the suspension can be quickly moved by an infinitesimal distance in a sway direction (or transversely relative to tracks) by applying a voltage to and thereby deforming the actuator element.

As disclosed in Jpn. Pat. Appin. KOKAI Publications Nos. 2003-059219 (Patent Document 1) and 2010-146631 (Patent Document 2), moreover, there are known DSA suspensions in which a microactuator element is disposed on a gimbal portion of a flexure.

A microactuator disclosed in Patent Document 1 is called a piggyback microactuator. In the piggyback microactuator, a microactuator element of PZT or the like is superposed on the back surface of a slider. In this case, the thickness of the microactuator element is added to that of the slider. Therefore, the thickness of a head portion of a head gimbal assembly increases, making it difficult to reduce the thickness of a disk drive. In some piggyback microactuators, a load caused by a mechanical shock, if any, applied to the head gimbal assembly may act on the slider and the microactuator element. Thus, microactuator elements of a fragile material such as PZT are liable to be broken.

On the other hand, a microactuator disclosed in Patent Document 2 comprises a microactuator element secured to one surface (facing a load beam) of a tongue and a slider secured to the other surface of the tongue. In the case of this microactuator, the distal end of a dimple formed on the load beam contacts the one surface of the tongue. It is necessary, therefore, to make the thickness of the microactuator element smaller than the projection height of the dimple. Accordingly, there is a problem that microactuator elements of a fragile material such as PZT are easily broken.

Further, a conductive circuit portion of a conventional DSA suspension easily swings, since it is disposed externally bypassing a pair of microactuator elements. In this case, the conductive circuit portion flaps as the driven microactuator elements vibrate, and a gimbal portion is inevitably influenced by the vibration. As a slider is pivoted by the microactuator elements, moreover, the conductive circuit portion is tensioned because of its large amount of movement, thereby possibly hindering the pivoting motion of the slider. If a part of the conductive circuit portion is disposed near the microactuator elements, furthermore, the fragile microactuator elements may be broken when contacted by the conductive circuit portion.

BRIEF SUMMARY OF THE INVENTION

Accordingly, the object of this invention is to provide a disk drive suspension configured so that the flexibility of the thickness of microactuator elements is high, the movement of a conductive circuit portion can be reduced while the microactuator elements are driven, and the microactuator elements can be prevented from being damaged.

A disk drive suspension according to an embodiment comprises a load beam and a flexure. The flexure comprises a stationary part secured to the load beam and a gimbal portion on which the slider is mounted. Microactuator elements each comprising first and second end portions are disposed on either side of the slider. The flexure comprises a pair of first supporting portions, a pair of second supporting portions, and a tongue on which the slider is mounted. The respective first end portions of the pair of microactuator elements are secured individually to the pair of first supporting portions. The respective second end portions of the pair of microactuator elements are secured individually to the pair of second supporting portions. Further, the suspension comprises a supporting protrusion (e.g., a convex surface of a dimple), swingably supporting the tongue relative to the load beam, and a conductive circuit portion. The conductive circuit portion comprises a conductor conducting to an element of the slider and a conductor connected to electrodes of the microactuator elements. Furthermore, the conductive circuit portion comprises a first wiring pattern portion disposed between the pair of microactuator elements on the tongue and a second wiring pattern portion extending rearwardly relative to the gimbal portion from the first wiring pattern portion.

According to the arrangement of this embodiment, the microactuator elements are disposed on either side of the slider. The first wiring pattern portion is disposed between the microactuator elements, and the second wiring pattern portion extends rearwardly relative to the gimbal portion from between the microactuator elements. While the microactuator elements are driven, therefore, the conductive circuit portion can be kept from flapping, since it moves less than a conventional version disposed outside microactuator elements. In addition, the conductive circuit portion is not located above the microactuator elements, so that the microactuator elements can be prevented from being damaged by contact with the conductive circuit portion. Further, the flexibility of the thickness of the microactuator elements is so high that the available microactuator elements are high in mechanical strength.

In the embodiment described above, the gimbal portion may comprise a first surface facing the load beam and a second surface opposite to the first surface, and the slider, the microactuator elements, and the conductive circuit portion may be all disposed on the second surface. Further, the tongue may comprise a first tongue portion which is formed between the pair of first supporting portions and on which a leading-side portion of the slider is disposed for movement, a second tongue portion which is formed between the pair of second supporting portions and to which a trailing-side portion of the slider is secured, and a hinge portion formed between the first and second tongue portions. The hinge portion is narrower than the first and second tongue portions and pivotably connects the tongue portions. Furthermore, openings may be defined between the first and second supporting portions, whereby front-rear intermediate portions of the microactuator elements are prevented from contacting the tongue portions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a perspective view of a suspension according to a first embodiment;

FIG. 5 is a perspective view of the microactuator mounting section of FIG. 4 taken from a tongue;

FIG. 6 is a plan view of the microactuator mounting section of FIG. 5;

FIG. 12 is a plan view schematically showing the microactuator mounting section with microactuator elements driven;

FIG. 14 is a bottom view of a microactuator mounting section according to a third embodiment; and FIG. 15 is a bottom view of a microactuator mounting section according to a fourth embodiment.

DETAILED DESCRIPTION OF THE INVENTION

A disk drive suspension according to a first embodiment of the present invention will now be described with reference to FIGS. 1 to 12.

Figure 1:
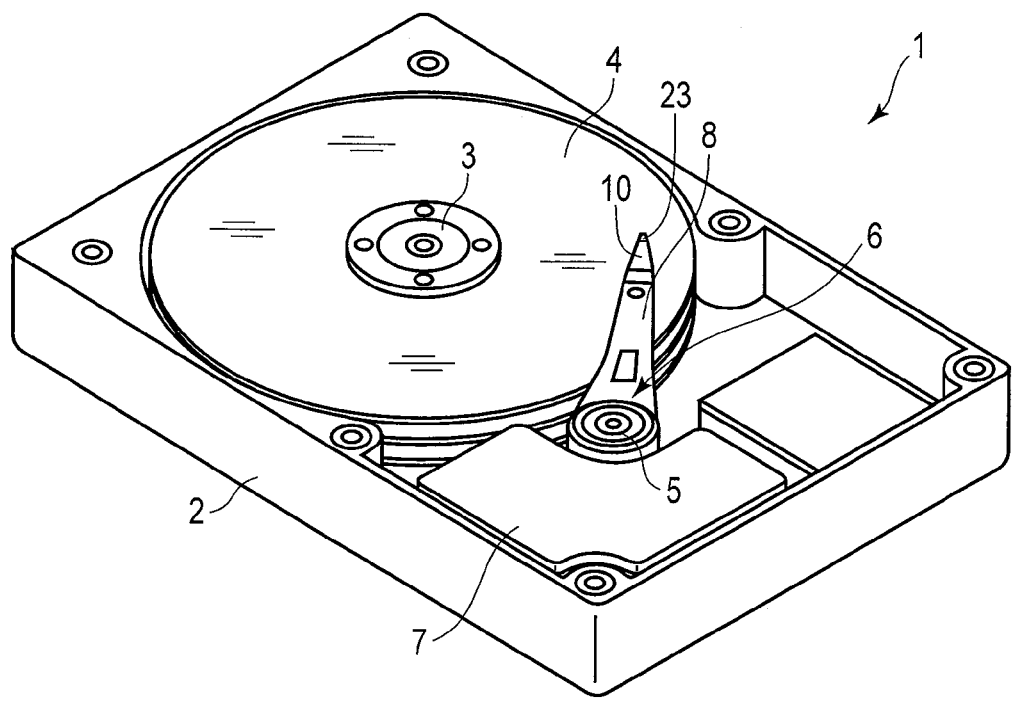
FIG. 1 is a perspective view showing an example of a disk drive.

A disk drive (HDD) 1 shown in FIG. 1 comprises a case 2, disks 4 rotatable about a spindle 3, carriage 6 turnable about a pivot 5, positioning motor (voice coil motor) 7 for actuating the carriage 6, etc. The case 2 is sealed by a 11d (not shown).

Figure 2:
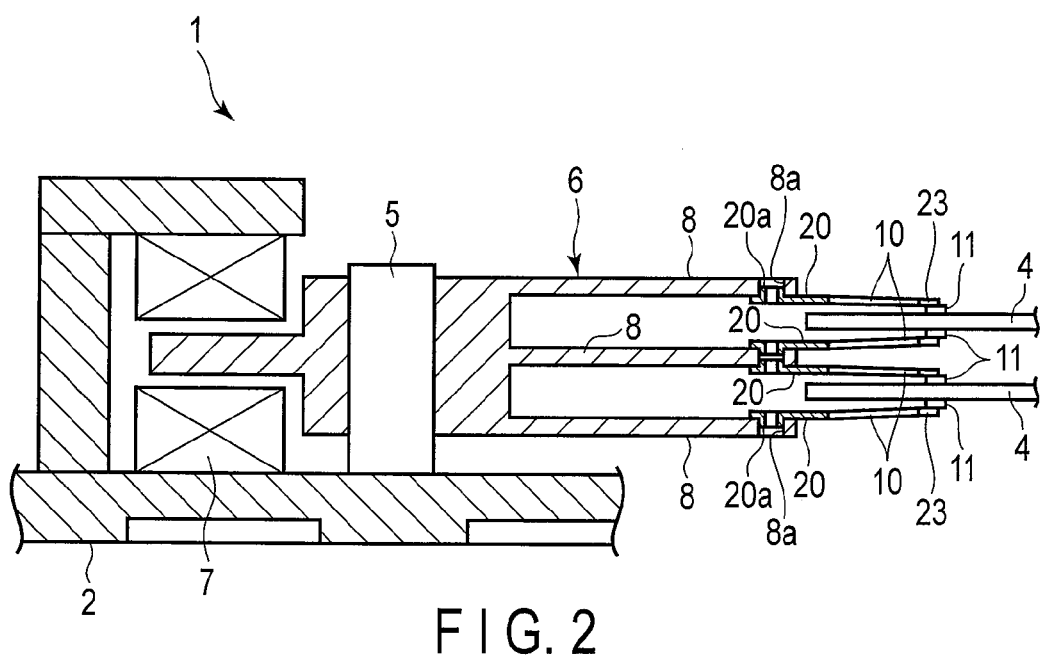
FIG. 2 is a partial sectional view of the disk drive shown in FIG. 1.

FIG. 2 is a sectional view schematically showing a part of the disk drive 1. As shown in FIGS. 1 and 2, the carriage 6 comprises arms (carriage arms) 8. A suspension 10 is mounted on the distal end portion of each arm 8. A slider 11, which constitutes a magnetic head, is provided on the distal end portion of the suspension 10. In a state where each disk 4 rotates at high speed, an air bearing is formed between the disk and the slider 11 as air flows in between the disk 4 and slider 11. If the carriage 6 is turned by the positioning motor 7, the suspension 10 moves radially relative to the disk 4. Thereupon, the slider 11 moves to a desired track of the disk 4.

FIG. 3 shows the suspension 10 of the dual-stage-actuator (DSA) type. This suspension 10 comprises a baseplate 20 secured to its corresponding arm 8 (FIGS. 1 and 2) of the carriage 6, load beam 21, flexure 22 with conductors, microactuator mounting section 23 located near the distal end of the suspension 10, etc. A boss portion 20a to be inserted into a hole 8a (FIG. 2) in each arm 8 is formed on the baseplate 20.

In FIG. 3, arrows X and Y indicate the longitudinal direction of the load beam 21, that is, the longitudinal direction (front-rear direction) of the suspension 10, and a sway direction (transverse direction of the slider 11), respectively. Spring portions 25 capable of thickness wise springy deformation are formed on the proximal portion (rear end portion) of the load beam 21. The flexure 22 is disposed along the load beam 21.

Figure 4:
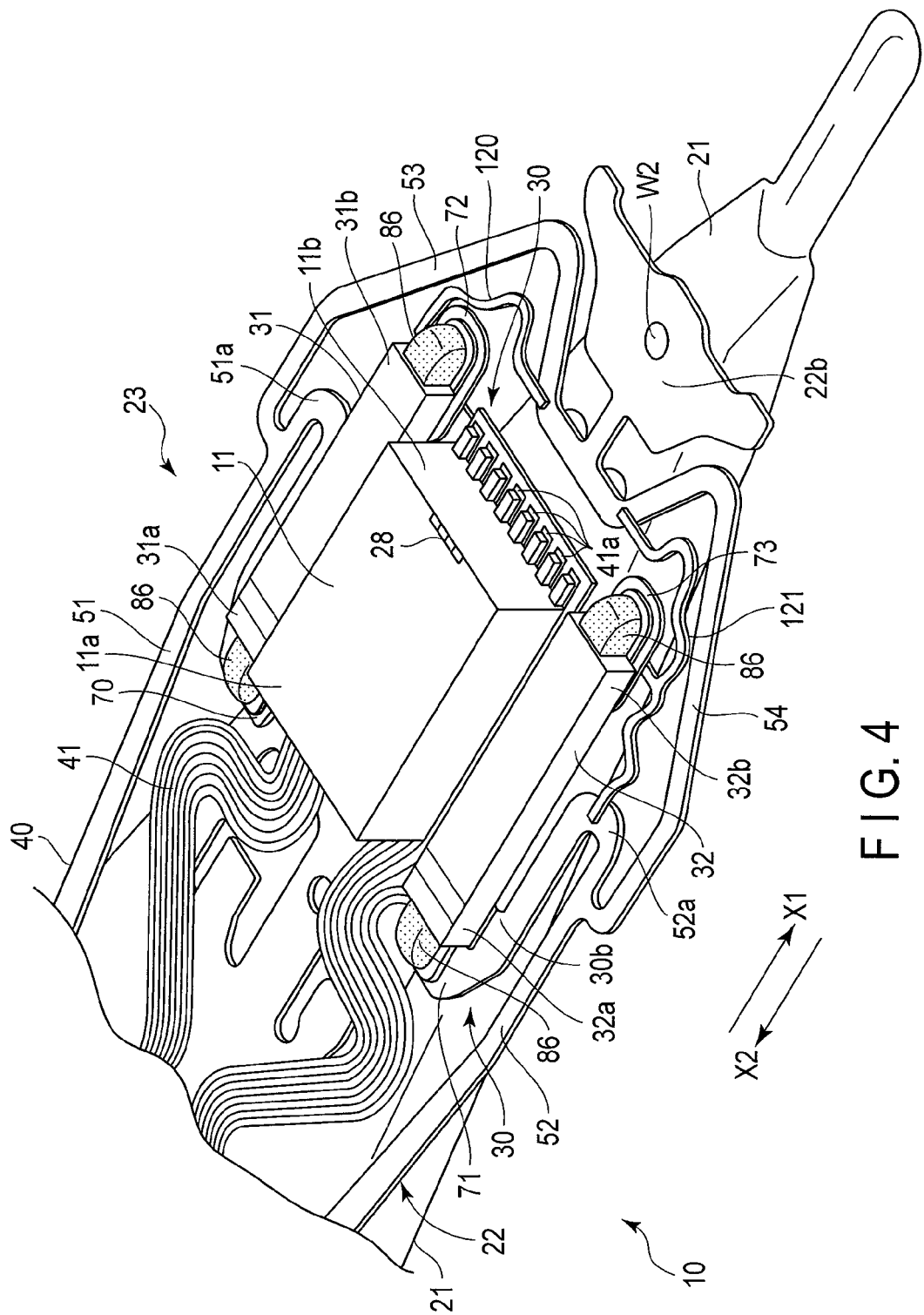
FIG. 4 is a perspective view of a microactuator mounting section of the suspension of FIG. 3 taken from a slider.

FIG. 4 is a perspective view of the microactuator mounting section 23 taken from the side of the slider 11. Microactuator mounting section 23 is disposed on the distal end portion of the suspension 10. Elements 28, such as magnetoresistive (MR) elements capable of conversion between magnetic and electrical signals, are disposed on an end portion of the slider 11 that constitutes the magnetic head. These elements 28 serve to access data, that is, write or read data to or from the disk 4. The slider 11, load beam 21, flexure 22, etc., constitute a head gimbal assembly.

Microactuator mounting section 23 comprises a gimbal portion 30 formed on the distal end portion of the flexure 22 and a pair of microactuator elements 31 and 32. These microactuator elements 31 and 32 are disposed individually on the opposite sides of the slider 11 on the gimbal portion 30. Microactuator elements 31 and 32 are formed of piezoelectric plates of PZT or the like and have the function of pivoting the slider 11 in the sway direction by means of a structure described in detail later.

Figure 7:
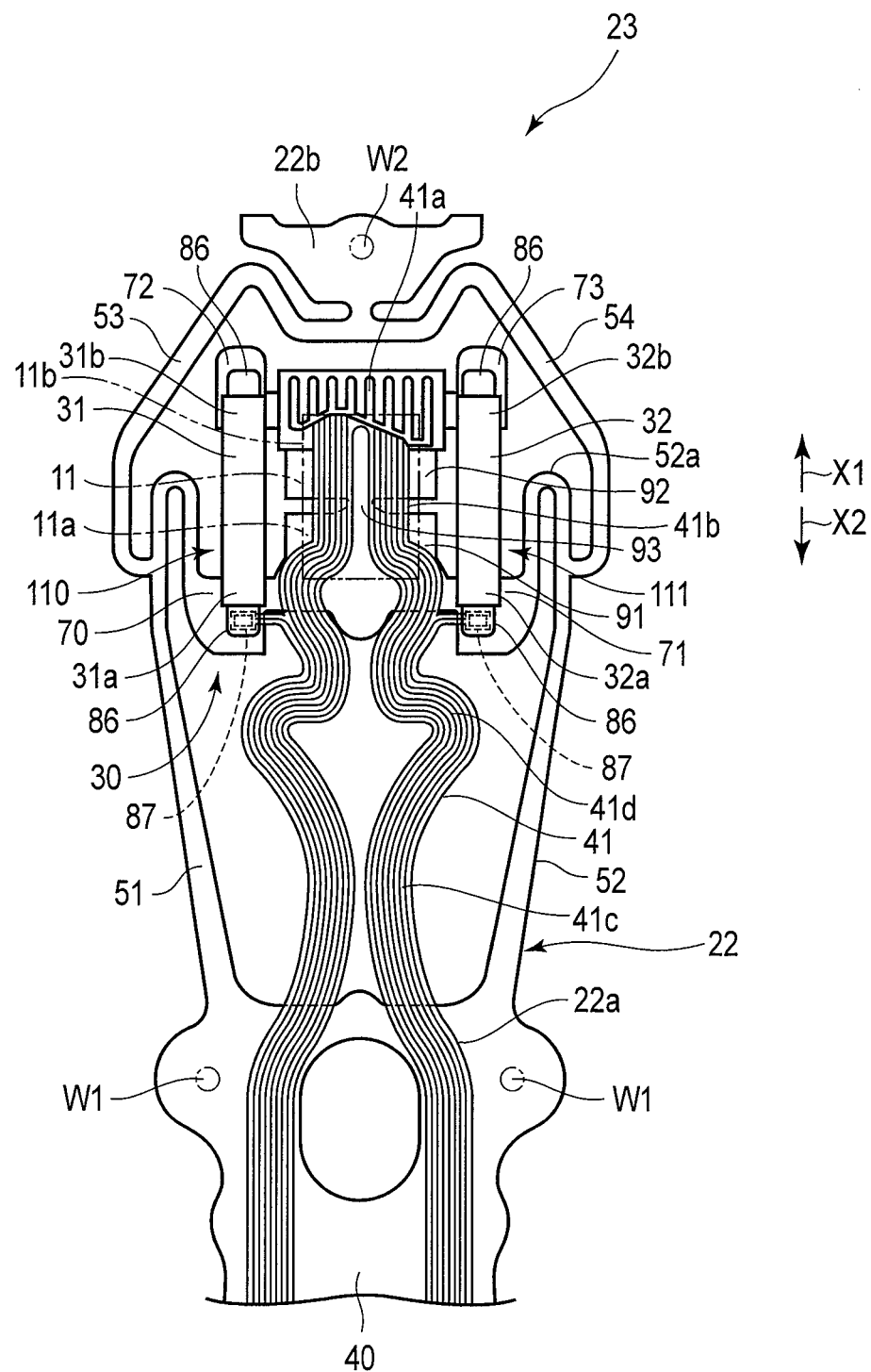
FIG. 7 is a bottom view of the microactuator mounting section of FIG. 5 taken from the side opposite to FIG. 5.

FIG. 5 is a perspective view of the gimbal portion 30 on the distal end portion of the flexure 22 taken from the side opposite to FIG. 4. Microactuator elements 31 and 32 are disposed on the gimbal portion 30. FIG. 6 is a plan view showing the gimbal portion 30 and microactuator elements 31 and 32. The flexure 22 comprises a metal base 40, formed of a stainless-steel plate, and a conductive circuit portion 41. The conductive circuit portion 41 is disposed along the metal base 40. The conductive circuit portion 41 comprises a part overlapping the metal base 40 and a part not overlapping the metal base 40. FIG. 7 is a bottom view of the microactuator mounting section 23 taken from the side of the conductive circuit portion 41.

The metal base 40 is secured to the load beam 21. An example of fixing means comprises first welds W1 (FIGS. 3, 6, etc.) and a second weld W2 (FIGS. 3 to 7) formed by laser welding. The flexure 22 comprises first and second stationary parts 22a and 22b. The first stationary part 22a is secured to the load beam 21 by weld W1 at a front-rear intermediate portion of the suspension 10. The second stationary part 22b is secured to the load beam 21 by weld W2 in a position near the distal end of the flexure 22. A rear portion 22c (FIG. 3) of the flexure 22 extends rearward from the baseplate 20.

As shown in FIGS. 5 to 7, the metal base 40 of the flexure 22 comprises a pair of first arms 51 and 52 and a pair of second arms 53 and 54. The first arms 51 and 52 connect with the first stationary part 22a, and the second arms 53 and 54 with the second stationary part 22b. Respective distal end portions 51a and 52a of the first arms 51 and 52 are U-shaped. The respective rear ends of the second arms 53 and 54 are connected to the vicinity of the distal end portions 51a and 52a.

Figure 8:
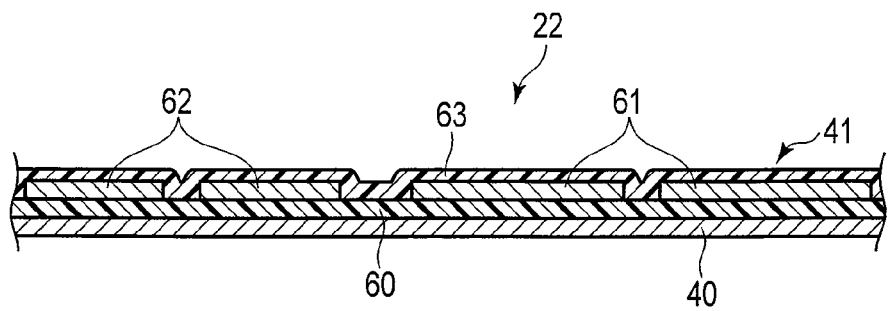
FIG. 8 is a partial sectional view of a conductive circuit portion of a flexure of the suspension.

FIG. 8 shows an example of cross-sections of the metal base 40 and conductive circuit portion 41. The conductive circuit portion 41 comprises an insulating layer 60, write conductors 61, read conductors 62, and cover layer 63. The insulating layer 60 and cover layer 63 are made of an electrically insulating resin, such as polyimide. The conductors 61 and 62 are formed on the insulating layer 60. The cover layer 63 covers the conductors 61 and 62. The write and read conductors 61 and 62 are connected to the elements 28 of the slider 11. For example, the metal base 40 is 20 μm (12 to 25 μm) thick; insulating layer 60, 10 μm (5 to 20 μm) thick; conductors 61 and 62, 9 μm (4 to 15 μm) thick; and cover layer 63, 5 μm (2 to 10 μm). The thickness of the metal base 40 is smaller than that (e.g., 30 μm) of the load beam 21.

The pair of microactuator elements 31 and 32 are disposed on the gimbal portion 30 of the flexure 22.

The gimbal portion 30 comprises a first surface 30a (FIGS. 5 and 10) facing the load beam 21 and a second surface 30b (FIGS. 4 and 10) opposite to the first surface 30a. The slider 11 and microactuator elements 31 and 32 are disposed on the second surface 30b.

Microactuator elements 31 and 32 comprise first end portions 31a and 32a and second end portions 31b and 32b, respectively. Arrows X1 and X2 in FIGS. 4 and 6 indicate forward and rearward directions, respectively, with respect to microactuator elements 31 and 32. The first end portions 31a and 32a of microactuator elements 31 and 32 are secured to a pair of first supporting portions 70 and 71, respectively, formed on the gimbal portion 30. The first supporting portions 70 and 71 connect with the first stationary part 22a of the flexure 22 through the flexible first arms 51 and 52, respectively. The distal end portions 51a and 52a of the first arms 51 and 52 connect with the second stationary part 22b of the flexure 22 through the second arms 53 and 54, respectively. Thus, the first supporting portions 70 and 71 are supported on the stationary parts 22a and 22b by the first arms 51 and 52 and second arms 53 and 54 that can be elastically deformed relative to the load beam 21. The second end portions 31b and 32b of microactuator elements 31 and 32 are secured to a pair of second supporting portions 72 and 73, respectively, formed on the gimbal portion 30.

Figure 9:
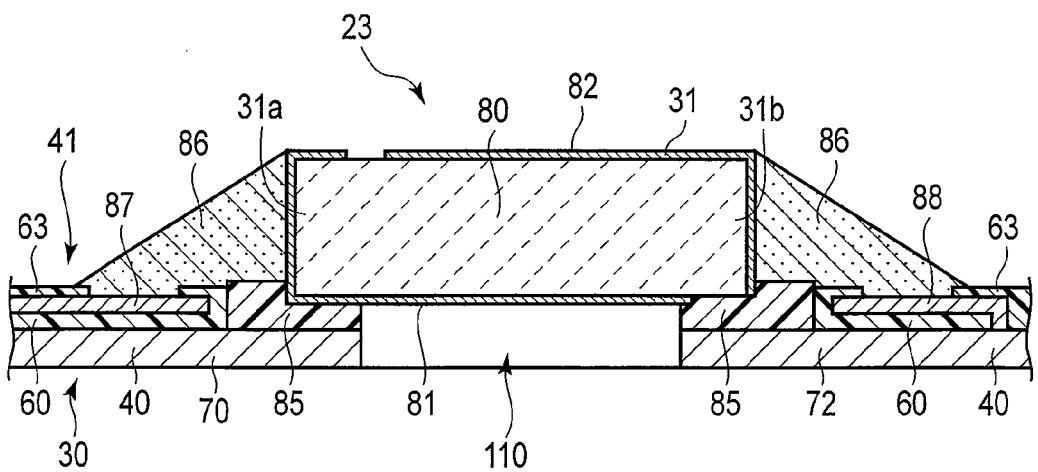
FIG. 9 is a sectional view of the microactuator mounting section of FIG. 4.

FIG. 9 shows cross-sections of joint portions of the one microactuator element 31 (of the pair of microactuator elements 31 and 32). The opposite end portions 31a and 31b of microactuator element 31 are secured to the gimbal portion 30 and electrically connected to the conductive circuit portion 41 by the joint portions. Since joint portions at the opposite end portions 32a and 32b of the other microactuator element 32 are constructed in the same manner as those shown in FIG. 9, the one microactuator element 31 will be representatively described below.

As shown in FIG. 9, microactuator element 31 comprises a PZT element 80 and first and second electrodes 81 and 82 formed on the peripheral surface of the PZT element 80. The first electrode 81 is formed ranging from one end surface of the PZT element 80 to the lower surface thereof. The second electrode 82 is formed ranging from the other end surface of the PZT element 80 to the upper surface thereof. The first end portion 31a of microactuator element 31 is secured to the first supporting portion 70 of the gimbal portion 30 by an electrically insulating adhesive layer 85. The second end portion 31b of microactuator element 31 is secured to the second supporting portion 72 by another adhesive layer 85.

The first electrode 81 shown in FIG. 9 conducts to conductors 87 of the conductive circuit portion 41 through an electrically conductive adhesive layer (for example, silver paste) 86 on the first supporting portion 70. The second electrode 82 conducts to a ground-side conductor 88 through another adhesive layer 86 on the second supporting portion 72. The ground-side conductor 88 is secured to and conducts to the metal base 40.

As shown in FIGS. 5 and 6, the gimbal portion 30 of the flexure 22 comprises a first tongue portion 91 on the stationary side, a movable second tongue portion 92, and a hinge portion 93 formed between the tongue portions 91 and 92. The first tongue portion 91 is formed between the first supporting portions 70 and 71, and the second tongue portion 92 between the second supporting portions 72 and 73. The hinge portion 93 is formed between the first and second tongue portions 91 and 92. The first supporting portions 70 and 71, second supporting portions 72 and 73, first and second tongue portions 91 and 92, and hinge portion 93 all constitute a part of the metal base 40, and their respective contours are formed by, for example, etching. The first and second tongue portions 91 and 92 and hinge portion 93 constitute a tongue 90 configured to carry the slider 11 thereon.

As shown in FIG. 7, the conductive circuit portion 41 diverges left and right and passes above the first and second tongue portions 91 and 92. Terminals 41a for the slider 11 are formed on the distal end of the conductive circuit portion 41. These terminals 41a conduct to the conductors 61 and 62 of the conductive circuit portion 41 and are electrically connected to the elements 28 (FIG. 4) of the slider 11. The conductors 87 for microactuator elements 31 and 32 are provided individually on the opposite sides, left and right, of the conductive circuit portion 41. On the first supporting portions 70 and 71, the conductors 87 are connected individually to the respective electrodes 81 of microactuator elements 31 and 32.

The conductive circuit portion 41 comprises first and second wiring pattern portions 41b and 41c. The first wiring pattern portion 41b is disposed between microactuator elements 31 and 32. The second wiring pattern portion 41c extends rearwardly relative to the gimbal portion 30 from the first wiring pattern portion 41b. A curved portion 41d is formed on a longitudinal part of the second wiring pattern portion 41c. The curved portion 41d serves to reduce the bending stiffness of the conductive circuit portion 41 between the first arms 51 and 52.

Thus, the conductive circuit portion 41 comprises the first wiring pattern portion 41b disposed between the pair of microactuator elements 31 and 32. The first wiring pattern portion 41b passes between microactuator elements 31 and 32. The first wiring pattern portion 41b extends rearwardly relative to the gimbal portion 30 from the leading-side portion 11a of the slider 11. The hinge portion 93 is provided between microactuator elements 31 and 32. In other words, the first wiring pattern portion 41b passes on each side of the hinge portion 93 and extends longitudinally relative to the gimbal portion 30. Further, the first wiring pattern portion 41b is secured to the first and second tongue portions 91 and 92 through the insulating layer 60 of polyimide or the like.

Figure 10:
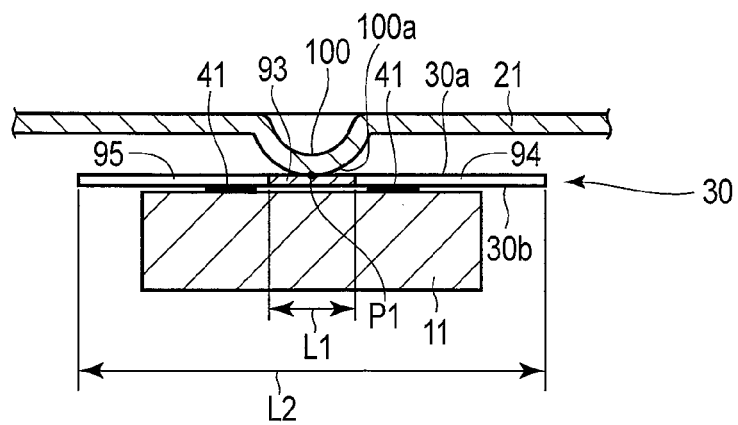
FIG. 10 is a sectional view showing a dimple on a load beam and a part of a gimbal portion.
Figure 11:
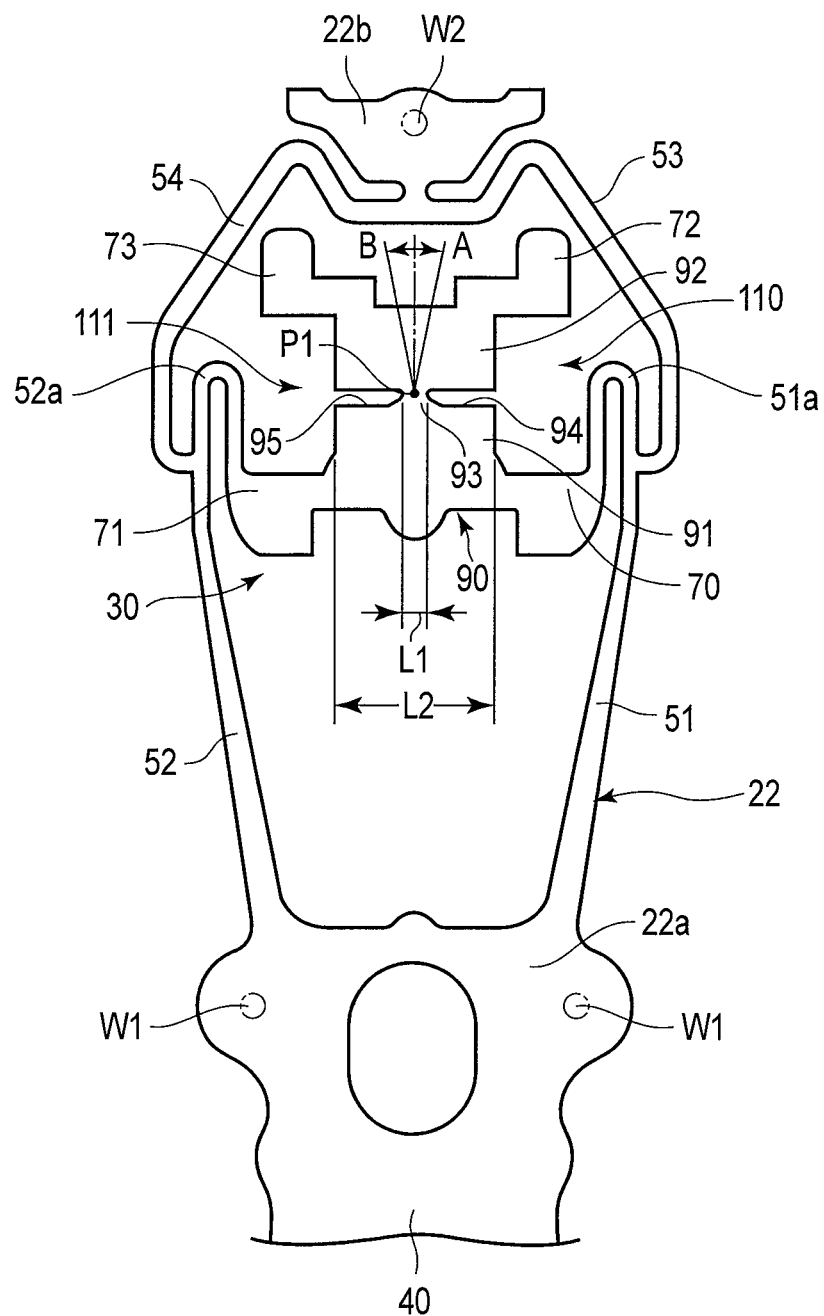
FIG. 11 is a plan view of the gimbal portion of the flexure of the microactuator mounting section of FIG. 5.

FIG. 10 is a partial sectional view of the load beam 21 and gimbal portion 30 taken at the location of the hinge portion 93. FIG. 11 is a plan view of the gimbal portion 30. Width L1 of the hinge portion 93 is sufficiently smaller than width L2 of each of the first and second tongue portions 91 and 92. Slits 94 and 95 are formed between the tongue portions 91 and 92 on the opposite sides of the hinge portion 93, individually. The tongue portions 91 and 92 are relatively pivotably connected together by the constricted hinge portion 93. Thus, the movable second tongue portion 92 is configured to move relative to the first tongue portion 91 on the stationary side in the directions indicated by arrows A and B in FIG. 11.

The slider 11 is disposed on the first and second tongue portions 91 and 92 and hinge portion 93. Further, a leading-side portion 11a of the slider 11 is disposed for movement relative to the first tongue portion 91. A trailing-side portion 11b of the slider 11 is secured to the second tongue portion 92. The "leading side" stated herein is the side where air flows in between the slider 11 and disk 4 as the disk rotates. On the other hand, the "trailing side" is the side where air between the slider 11 and disk 4 comes out. The hinge portion 93 is formed in a center position 11c of the slider 11, for example, the center of gravity of the slider 11 or the center thereof with respect to both transverse and longitudinal directions.

A dimple 100 (FIG. 10) is formed near the distal end of the load beam 21. The dimple 100 comprises a supporting protrusion 100a formed of a convex surface projecting toward the gimbal portion 30. The distal end of the supporting protrusion 100a abuts the hinge portion 93. In other words, the hinge portion 93 is swingably supported by the convex surface of the dimple 100. Thus, the gimbal portion 30 is supported for swinging motion relative to the load beam 21 about a point of contact P1 between the hinge portion 93 and the distal end of the dimple 100.

Alternatively, a dimple may be formed on the hinge portion 93 such that its distal end abuts the load beam 21. In short, the supporting protrusion 100a, such as the dimple, should only be formed on one of the respective facing surfaces of the load beam 21 and hinge portion 93 so that it abuts the other facing surface.

One opening 110 (on the right-hand side of FIG. 11) is formed between the first and second supporting portions 70 and 72. Opening 110 communicates with the one slit 94. The other opening 111 (on the left-hand side of FIG. 11) is formed between the first and second supporting portions 71 and 73. Opening 111 communicates with the other slit 95.

Since openings 110 and 111 are thus formed on the opposite sides of the tongue portions 91 and 92, respectively, front-rear (or longitudinal) intermediate portions of the elements 31 and 32 can be prevented from contacting the tongue portions 91 and 92. If the suspension 10 is subjected to external mechanical shock, therefore, the longitudinal intermediate portions of the elements 31 and 32 can be prevented from being struck by the tongue portions 91 and 92. Thus, the elements 31 and 32 can be prevented from being damaged by being struck. The longitudinal direction of microactuator elements 31 and 32 stated herein is the direction of the extending and contracting strokes of microactuator elements 31 and 32.

As shown in FIGS. 4 and 5, the gimbal portion 30 of the present embodiment comprises limiter members 120 and 121. The one limiter member 120 is connected to the distal end portion 51a of the one first arm 51, second arm 53, and second supporting portion 72. The other limiter member 121 is connected to the distal end portion 52a of the other first arm 52, second arm 54, and second supporting portion 73.

The limiter members 120 and 121 are a part of the resin insulating layer 60 of polyimide or the like, which constitutes a part of the conductive circuit portion 41. Since these limiter members 120 and 121 are undulating as viewed from above the gimbal portion 30, their rigidity in the stroke direction is low. Thus, there is no hindrance to the movement of the second tongue portion 92 as microactuator elements 31 and 32 are driven. The limiter members 120 and 121 have the function of keeping the gimbal portion 30 from moving away from the dimple 100 (dimple separation) if the suspension 10 is subjected to external mechanical shock.

The following is a description of the operation of the suspension 10 of the present embodiment.

If the carriage 6 (FIGS. 1 and 2) is turned by the positioning motor 7, the suspension 10 moves radially relative to the disk 4. Thereupon, the slider 11 of the magnetic head moves to a desired track of the recording surface of the disk 4. If a voltage is applied to microactuator elements 31 and 32, microactuator elements 31 and 32 are oppositely distorted relative to each other as to the voltage. In this way, the load beam 21 can be moved by an infinitesimal distance in the sway direction (indicated by arrow Y in FIG. 3).

As schematically shown in FIG. 12, for example, the second tongue portion 92 moves in the direction of arrow A as the one and the other microactuator elements 31 and 32 contract and extend, respectively. Thus, the elements 28 (FIG. 4) on the slider 11 can be quickly precisely positioned in the sway direction. Actually, the movement distance of the slider 11 in the sway direction ranges from several nm to several tens of nm. In FIG. 12, however, the degree of deformation of the gimbal portion 30 is exaggeratedly indicated for better understanding of the movements of the slider 11 and second tongue portion 92.

In microactuator mounting section 23 of the present embodiment, the movable second tongue portion 92 pivots transversely about the hinge portion 93, with respect to the first tongue portion 91 on the stationary side, if microactuator elements 31 and 32 are driven. The trailing-side portion 11b of the slider 11 is secured to the second tongue portion 92. In contrast, the leading-side portion 11a of the slider 11 is movable relative to the first tongue portion 91.

As shown in FIG. 10, the distal end of the dimple 100 abuts the hinge portion 93 at the point of contact P1.

If microactuator elements 31 and 32 are driven by application of a voltage, therefore, the second tongue portion 92 and slider 11 pivot about the point of contact P1 with the dimple 100. Thus, the pivot center of the slider 11 can be matched with the position of the contact point P1. In this way, the distal end of the dimple 100 can be kept from rubbing against the flexure 22 when microactuator elements 31 and 32 are driven (or when the slider 11 is pivoted). Thus, production of high frictional resistance or a causative agent of contamination during the pivoting motion of the second tongue portion 92 can be suppressed.

In addition, microactuator elements 31 and 32 are disposed on the second surface 30b of the gimbal portion 30 on the same side as the slider 11. Therefore, the thickness of each of microactuator elements 31 and 32 need not be made smaller than the projection height of the dimple 100. Accordingly, thick structures can be used for microactuator elements 31 and 32. Thus, the available microactuator elements 31 and 32 provide high output load and mechanical strength and are hard to break.

As described above, the first wiring pattern portion 41b is disposed between microactuator elements 31 and 32. The first wiring pattern portion 41b passes on each side of the hinge portion 93 and extends longitudinally relative to the gimbal portion 30. Specifically, the first wiring pattern portion 41b passes near the contact point P1 of the hinge portion 93 where the driven microactuator elements 31 and 32 move little. The second wiring pattern portion 41c extends rearwardly relative to the gimbal portion 30 from between microactuator elements 31 and 32.

In the microactuator mounting section 23 comprising the conductive circuit portion 41 constructed in this manner, the driven elements 31 and 32 move less than in a conventional version in which a conductive circuit portion is disposed outside microactuator elements. Accordingly, the conductive circuit portion 41 can be kept from being tensioned or flapping while the elements 31 and 32 are driven. In addition, the conductive circuit portion 41 is not located above the elements 31 and 32, so that the elements 31 and 32 can be prevented from being damaged by contact with the conductive circuit portion 41.

Figure 13:
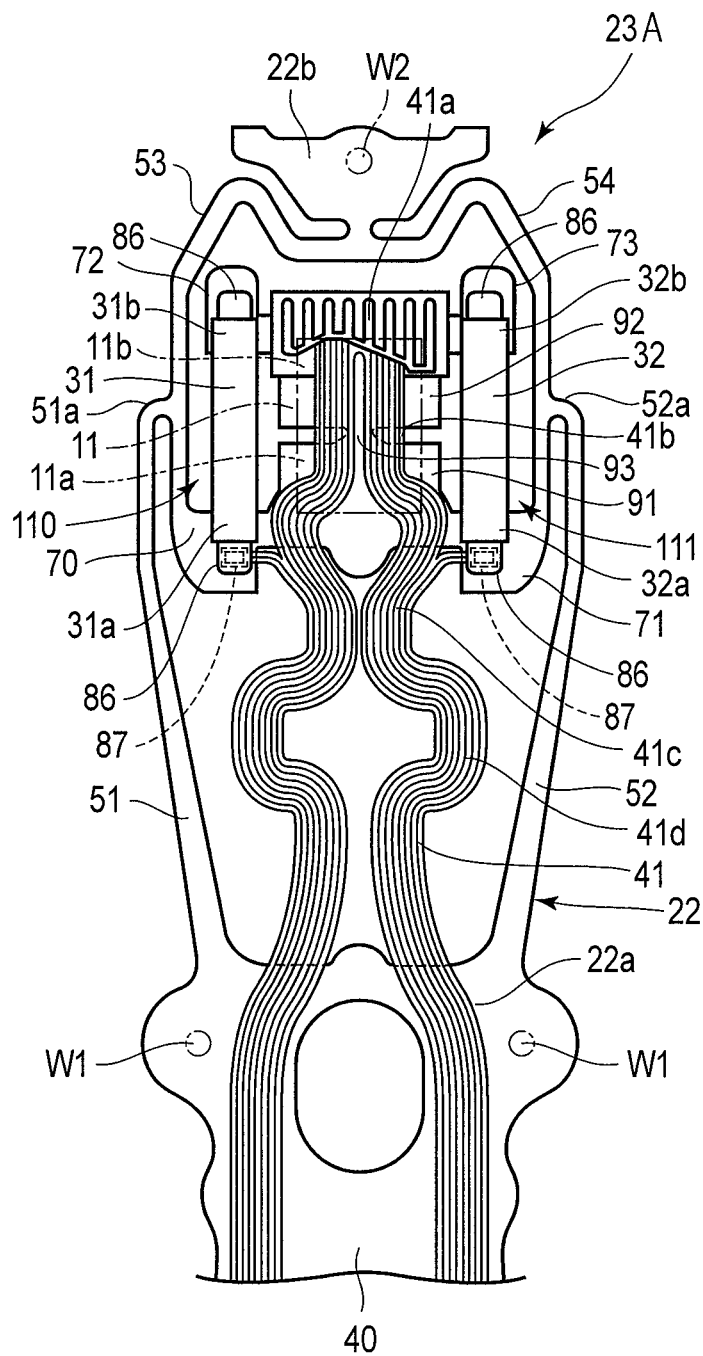
FIG. 13 is a bottom view of a microactuator mounting section according to a second embodiment.

FIG. 13 shows a microactuator mounting section 23A according to a second embodiment. Microactuator mounting section 23A of this embodiment is slightly different from microactuator mounting section 23 of the first embodiment in the forms of first arms 51 and 52 and second arms 53 and 54. Specifically, the second arms 53 and 54 of microactuator mounting section 23A of FIG. 13 are located inside the first arms 51 and 52, respectively. Further, respective distal end portions 51a and 52a of the first arms 51 and 52 are connected to the second arms 53 and 54, respectively. Since other configurations and effects are common to microactuator mounting sections 23 and 23A of the first and second embodiments, common numbers are used to designate common portions of the first and second embodiments, and a description of those portions is omitted.

FIG. 14 shows a microactuator mounting section 23B according to a third embodiment. Second arms 53 and 54 of this embodiment are connected to first arms 51 and 52, respectively. The second arms 53 and 54 are not secured to a load beam. First supporting portions 70 and 71, a first tongue portion 91, and the second arms 53 and 54 are supported on a stationary part 22a of a flexure 22 by the first arms 51 and 52. Since other configurations and effects are common to microactuator mounting sections 23 and 23B of the first and third embodiments, common numbers are used to designate common portions of the first and third embodiments, and a description of those portions is omitted.

FIG. 15 shows a microactuator mounting section 23C according to a fourth embodiment. First supporting portions 70 and 71 and a first tongue portion 91 of this embodiment are supported on a stationary part 22a of a flexure 22 by first arms 51 and 52 only. Since other configurations and effects are common to microactuator mounting sections 23B and 23C of the third (FIG. 14) and fourth embodiments, common numbers are used to designate common portions of the third and fourth embodiments, and a description of those portions is omitted.

It is to be understood, in carrying out the present invention, that the specific forms of the constituent elements of the microactuator mounting section, including the tongue of the flexure and the first and second supporting portions, as well as of the first and second wiring pattern portions and microactuator elements, may be modified variously.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension which comprises a load beam and a flexure comprising a stationary part secured to the load beam and a gimbal portion on which a slider is mounted, the gimbal portion comprising a first surface and a second surface which is opposite to the first surface, the slider being mounted on the second surface, and the disk drive suspension further comprising:

a pair of microactuator elements, each of the pair of microactuator elements being disposed on a respective side of the slider and comprising a first end portion and a second end portion, and the microactuator elements being mounted to the second surface;

a pair of first supporting portions of the gimbal portion to which the pair of first end portions are individually secured and supported by the stationary part;

a pair of second supporting portions of the gimbal portion to which the pair of second end portions are individually secured;

a tongue of the gimbal portion on which the slider is mounted;

a supporting protrusion swingably supporting the tongue relative to the load beam;

terminals for the slider disposed between the pair of second supporting portions on the second surface, the terminals being connected to an element of the slider; and a conductive circuit portion comprising a conductor conducting to the element of the slider, a conductor connected to electrodes of the microactuator elements, a first wiring pattern portion disposed between the pair of microactuator elements on the tongue and extending rearwardly relative to the microactuator elements from the terminals, and a second wiring pattern portion extending rearwardly relative to the tongue of the gimbal portion from the first wiring pattern portion.

2. The disk drive suspension of claim 1, wherein the first surface faces the load beam, and the slider, the microactuator elements, and the conductive circuit portion are all disposed on the second surface.

3. The disk drive suspension of claim 2, wherein the tongue comprises a first tongue portion which is formed between the pair of first supporting portions and on which a leading-side portion of the slider is disposed for movement, a second tongue portion which is formed between the pair of second supporting portions and to which a trailing-side portion of the slider is secured, and a hinge portion which is formed between the first and second tongue portions, is narrower than the tongue portions, and pivotably connects the tongue portions.

4. The disk drive suspension of claim 3, wherein the supporting protrusion is a convex surface of a dimple formed on the load beam, the convex surface of the dimple abutting the hinge portion.

5. The disk drive suspension of claim 3, wherein openings are defined between the first and second supporting portions, said openings preventing front-rear intermediate portions of the microactuator elements from contacting the first and second tongue portions.

6. The disk drive suspension of claim 1, wherein the tongue comprises a first tongue portion which is formed between the pair of first supporting portions and on which a leading-side portion of the slider is disposed for movement, a second tongue portion which is formed between the pair of second supporting portions and to which a trailing-side portion of the slider is secured, and a hinge portion which is formed between the first and second tongue portions, is narrower than the tongue portions, and pivotably connects the tongue portions.

7. The disk drive suspension of claim 6, wherein the supporting protrusion is a convex surface of a dimple formed on the load beam, the convex surface of the dimple abutting the hinge portion.

8. The disk drive suspension of claim 6, wherein openings are defined between the first and second supporting portions, said openings preventing front-rear intermediate portions of the microactuator elements from contacting the first and second tongue portions.

* * * * *